April 24, 1962    J. B. SANDERSON    3,030,921
ANIMAL SECURING GATE FOR STOCK CHUTE
Filed March 20, 1961    2 Sheets-Sheet 1
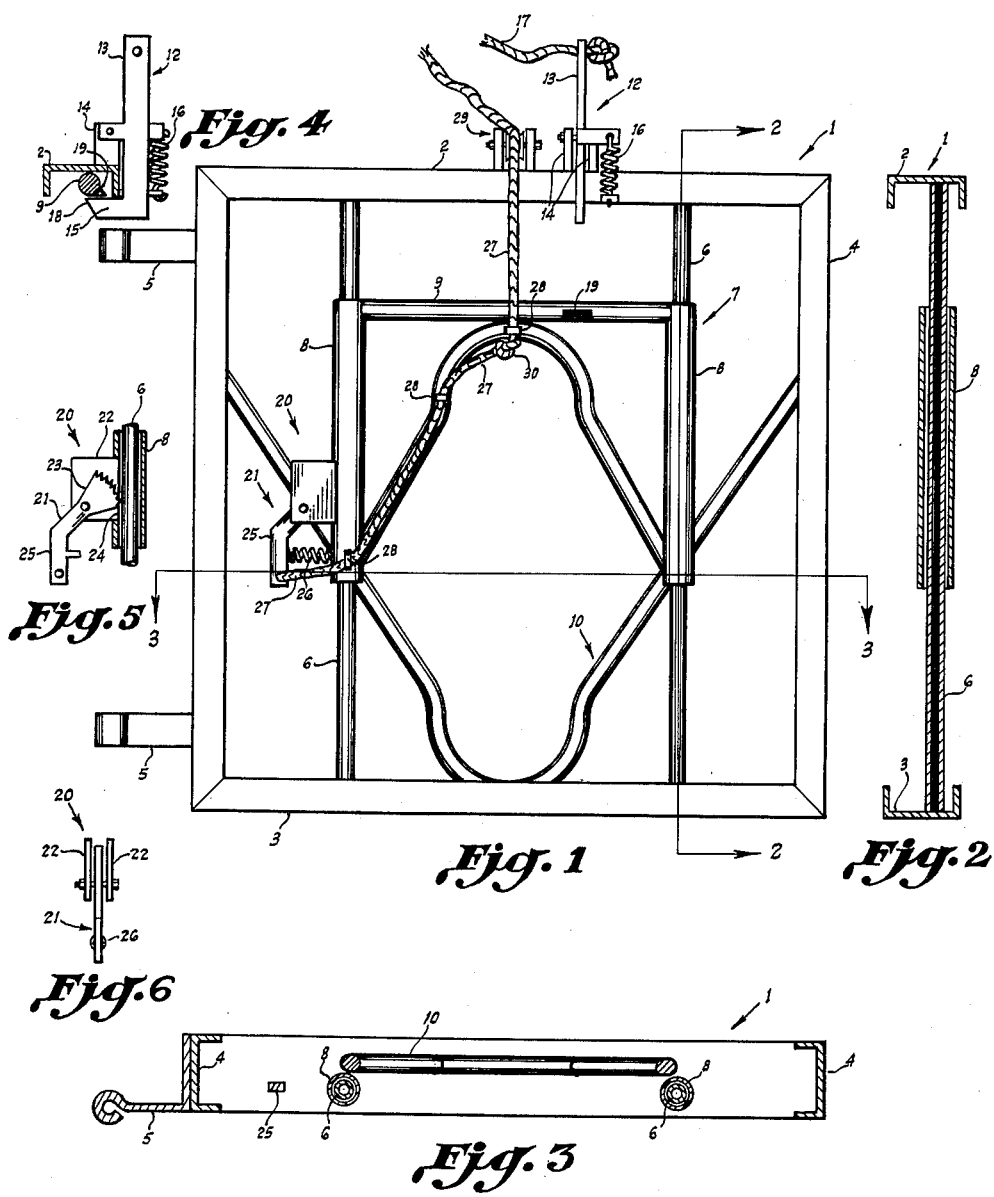
J. B. SANDERSON
INVENTOR.
ATTORNEY

J. B. SANDERSON
INVENTOR.

BY [signature]

ATTORNEY

United States Patent Office 3,030,921
Patented Apr. 24, 1962

3,030,921
ANIMAL SECURING GATE FOR STOCK CHUTE
J. B. Sanderson, Somervell County, Tex.
(Rte. 1, Paluxy, Tex.)
Filed Mar. 20, 1961, Ser. No. 96,961
3 Claims. (Cl. 119—98)

This invention concerns an animal securing gate which is intended to be installed in a stock chute, and which has means engageable about the neck of an animal upon driving the animal thru the chute, whereby the animal is adapted to be secured in the gate for operating on the animal in any desired manner, such as dehorning or castrating. Upon disengaging the means engageable with the animal's neck, and opening the gate, the animal is free to pass thru the gate whereby it is released.

The means engageable about the neck of an animal, as above described, includes a pair of oppositely extending, mutually overlapping V-shaped elements, one of which is rigidly connected to the gate frame and the other of which forms part of a movable frame which is slidable vertically on guides secured to the top and bottom rails of the gate frame. The V-shaped elements are engageable above and below the animal's neck to secure the animal in the gate.

The invention includes a spring biased latch mounted on the top rail of the gate frame, engageable under the top rail of the movable frame in its uppermost position, and releasable by pulling a rope attached thereto, whereby the movable frame is adapted to be secured in said uppermost position.

The invention further includes a latch mounted on the movable frame and frictionally engaging a guide therefor whereby the movable frame is secured against upward displacement relative to the gate frame, to thereby prevent the release of an animal secured in the gate. The last mentioned latch is releasable by pulling a second rope having an enlargement engageable with an abutment carried by the movable frame whereby the movable frame is adapted to be raised, by pulling the rope, after first pulling the rope sufficiently to release the latch.

An object of the invention is to provide an animal securing gate, adapted to be installed in a stock chute, whereby a single operator, acting alone and unassisted, may readily catch and secure an animal preparatory to operating on the animal in any desired manner, such as dehorning or castrating.

It is common practice to employ, for the purpose described, a stock chute having installed therein an animal securing gate having means engageable about the neck of an animal upon driving the animal thru the chute, whereby the animal is adapted to be secured in the gate, the animal being releasable upon disengaging the means engageable about its neck and opening the gate.

In the use of such apparatus, as heretofore practiced, it has been necessary to station an operator at the gate, to actuate the means engageable about the neck of an animal, while one or more other operators are required to drive the animal thru the chute.

This invention contemplates an animal securing gate as described whereby a single operator, acting alone and unassisted, may readily actuate the means engageable about the neck of an animal, by pulling the first mentioned rope, to thereby release the latch securing the movable frame in its uppermost position, while at the same time driving the animal thru the chute.

The invention further contemplates an animal securing gate as described in which the operator may readily disengage the means engageable about the neck of an animal, while at the same time resetting said means in its disengaged position, by pulling the second rope. This feature is advantageous following a bloody operation, such as dehorning, for the reason that it enables the operator to stand at a safe distance.

The invention further contemplates, in a stock chute, in combination with a pair of posts adapted to be positioned on opposite sides of a chute, a gate hinged to one of the posts having means engageable about the neck of an animal to secure the animal in the gate, as above described, a compression spring on said one of the posts acting on the adjacent side of the gate to bias the gate in its open position, and a latch on the other of the posts engageable with the opposite side of the gate to secure the gate in its closed position. The last mentioned latch is releasable by pulling a third rope operatively connected thereto.

The invention also contemplates, in the structure described, a pin on said other of the posts receivable in a hole in the adjacent side of the gate whereby the gate is additionally supported in its closed position.

The invention will be readily understood by referring to the following description and the accompanying drawing, in which:

FIG. 1 is a side elevational view of an animal securing gate embodying the invention adapted to be installed in a stock chute, for the purpose described;

FIG. 2 is a sectional elevational view taken on the line 2—2 of FIG. 1;

FIG. 3 is a sectional plan view taken on the line 3—3 of FIG. 1;

Figure 7:
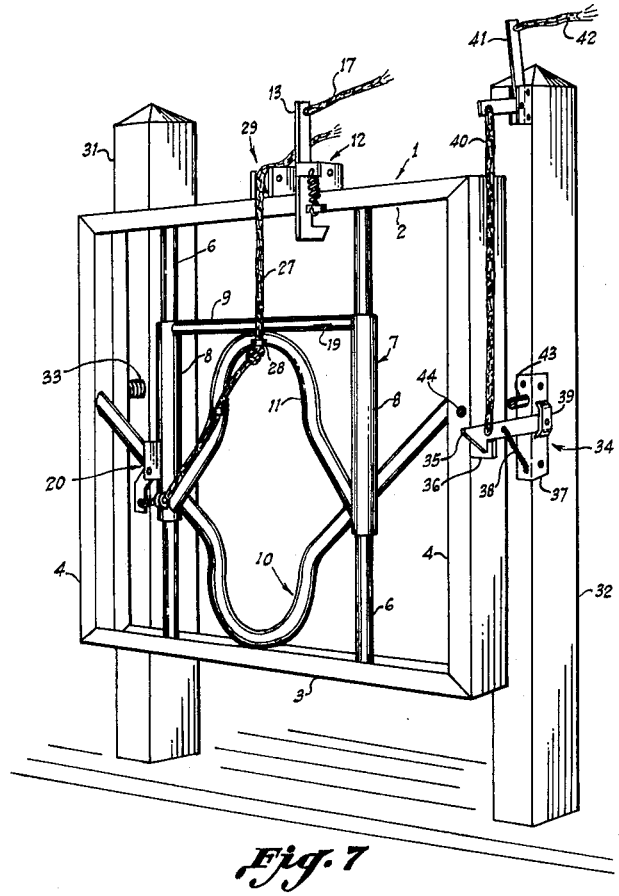

FIGS. 4, 5, and 6 are fragmentary views showing in detail the construction of the gate; and FIG. 7 is a perspective view showing the gate installed between the two posts, as in a stock chute, the posts being adapted to be positioned on opposite sides of a chute.

Referring to FIGS. 1 to 6 of the drawing, the numeral 1 designates generally an animal securing gate embodying the invention. The gate 1 includes a rectangular metal frame having a top rail 2, a bottom rail 3, and a pair of side rails 4. The rails 2, 3, and 4 are channel shaped in transverse section.

A pair of hinge elements 5 are rigidly connected to one of the side rails 4 and extend laterally outwardly therefrom for use, in conjunction with other complementary hinge elements (not shown), and latch means as hereinafter described, in installing the gate 1 in a stock chute.

A pair of vertically disposed tubular guide members 6 are rigidly connected at their ends to the top rail 2 and the bottom rail 3, in spaced apart relation to each other.

A vertically movable frame, designated generally by the numeral 7, has a pair of tubular side members 8, which are arranged telescopically relative to the respective tubular guide members 6 and are slidable thereon, and a round bar 9 which is arranged transversely relative to the tubular side members 8 and has its opposite ends rigidly connected to the upper ends of the respective tubular side members 8.

The gate 1 has means as hereinafter described engageable about the neck of an animal upon driving the animal thru a chute in which the gate 1 is installed, whereby the animal is adapted to be secured in the gate 1 for operating on the animal in any desired manner, such as dehorning or castrating. Upon disengaging the means engageable with the animal's neck, and opening the gate 1, the animal is free to pass thru the gate 1 whereby it is released.

The means engageable about the neck of an animal, as above described, includes a pair of oppositely extending, mutually overlapping V-shaped elements 10 and 11, each of which consists of a round bar which is curved intermediate its ends to form an arched, substantially U-shaped middle portion and has diverging end portions.

The V-shaped element 10 is rigidly connected to the frame of the gate 1 with its arched, substantially U-shaped middle portion secured to the bottom rail 3, centrally thereof, and with its diverging end portions extending inwardly and outwardly therefrom and secured to opposite side rails 4.

The V-shaped element 11 is rigidly connected to the vertically movable frame 7 with its arched, substantially U-shaped middle portion secured to the transverse bar 9, centrally thereof, and with its diverging end portions extending downwardly and outwardly therefrom and secured to opposite tubular side members 8.

The oppositely extending arched, substantially U-shaped middle portions of the V-shaped elements 11 and 10, which are mutually opposed, and are adjustable vertically relative to each other upon movement of the movable frame 7 relative to the tubular guide members 6, are engageable above and below an animal's neck, respectively, to secure the animal in the gate 1.

The numeral 12 designates generally a spring biased latch, as hereinafter described. The latch 12 includes a lever 13 which is fulcrumed intermediate its ends on a pair of upstanding lugs 14 mounted on the top rail 2, and having an angular end portion 15 which is engageable under the transverse bar 9 comprising the top rail of the vertically movable frame 7, whereby the movable frame 7 is adapted to be secured in its uppermost position.

A tension spring 16 acts on the lever 13 and the top rail 2 to maintain the angular end portion 15 of the lever 13 in engagement with the transverse bar 9.

A rope 17 is attached to the end of the lever 13 opposite the angular end portion 15 thereof whereby the lever 13 is adapted to be moved about its pivot, against the resistance of the spring 16, to thereby disengage the angular end portion 15 from the transverse bar 9, upon pulling the rope 17.

The movable frame 7 is thus adapted to be released, upon pulling the rope 17, whereby it falls on its own weight and the V-shaped element 11, which is carried by the movable frame 7, is engageable over the neck of an animal and coacts with the V-shaped element 10 to secure the animal in the gate 1.

The angular end portion 15 of the lever 13 has a beveled surface 18 which is engageable with a correspondingly beveled surface of a lug 19 formed on the transverse bar 9, upon upward movement of the vertically movable frame 7, whereby the lever 13 is movable about its pivot sufficiently to permit the transverse bar 9 to pass the angular end portion 15, which is engageable thereunder in response to the action of the spring 16.

The numeral 20 indicates generally another spring biased latch, as hereinafter described. The latch 20 includes a lever 21 which is fulcrumed intermediate its ends on a pair of lugs 22 attached to one of the tubular side members 8 and extending laterally outwardly therefrom.

The lever 21 has an arcuate, toothed end portion 23 which extends inwardly thru a slot 24 in the tubular side member 8, between the lugs 22, for frictional engagement with the corresponding tubular guide member 6, and has an angularly bent end portion 25 opposite the arcuate, toothed end portion 23 thereof.

A compression spring 26 acts on the angularly bent end portion 25 of the lever 21 to urge it laterally outwardly, whereby the arcuate, toothed end portion 23 thereof is biased inwardly for frictional engagement with the tubular guide member 6 to thereby secure the vertically movable frame 7 against upward displacement relative to the frame of the gate 1.

A second rope 27 is secured to the angularly bent end portion 25 of the lever 21. The latch 20 is releasable by pulling the second rope 27, to thereby move the lever 21 about its pivot, against the resistance of the spring 26, sufficiently to disengage the arcuate, toothed end portion 23 of the lever 21 from the tubular guide member 6.

The rope 27 is passed upwardly thru a plurality of eyes 28 carried by the adjacent tubular side member 8 and the V-shaped element 11, respectively, and is passed over a pulley, designated generally by the numeral 29, mounted on the upper rail 2.

The rope 27 has a knot 30 therein positioned below the uppermost eye 28 for abutment therewith whereby the vertically movable frame 7 is adapted to be raised by pulling the rope 27, after first pulling the rope 27 sufficiently to release the latch 20, as above described.

As shown in FIG. 7 of the drawing, the gate 1 is installed between two posts, numbered 31 and 32, respectively, which are adapted to be positioned on opposite sides of a stock chute.

The gate 1 is hinged to the post 31. A compression spring 33 on the post 31 acts on the adjacent side rail 4 of the gate 1 to bias the gate 1 in its open position.

A latch on the post 32, which is designated generally by the numeral 34, has a catch 35 which is engageable over a pin 36 connected to the adjacent side rail 4 of the gate 1 to secure the gate 1 in its closed position. The catch 35 is pivotally connected at one end to a piece of angle iron 37 overlying a corner of the post 32, and is biased downwardly in engagement with the pin 36 by a tension spring 38. An angularly bent strap 39, which overlies the connected end of the catch 35 and is connected at its ends to the angle iron 37, provides a stop limiting pivotal movement of the catch 35 in a downward direction. The catch 35 has a rope 40 connected thereto whereby the latch 34 is releasable by pulling the rope 40.

The end of the rope 40 opposite the catch 35 is connected to one end of a lever 41, which is mounted on the upper end of the post 32, above the latch 34. A rope 42 is connected to the opposite end of the lever 41, whereby the rope 40 may be pulled upwardly, to raise the catch 35, by pulling the rope 42.

Upon releasing the latch 34, the gate 1 is adapted to be swung open by the action of the compression spring 33.

The catch 35 has a beveled edge for engagement with the pin 36, upon closing the gate 1, whereby the catch 35 is raised sufficiently, against the resistance of the spring 38, to clear the pin 36 and thereby reset the latch 34.

A pin 43, which is connected to the angle iron 37, is receivable in a hole 44 in the adjacent side rail 4 of the gate 1 whereby the gate 1 is additionally supported in its closed position.

The invention may be modified in various ways without departing from the spirit and scope thereof.

I claim:

1. In combination with a stock chute having a pair of posts positioned on opposite sides thereof, a gate hinged to one of the posts and extending across the chute in its closed position, the gate comprising a rectangular gate frame having top, bottom, and side rails, a pair of elongated, vertically disposed guide members rigidly connected at their ends to the top and bottom rails of the gate frame, in spaced apart relation to each other, a movable frame having a pair of tubular side members arranged telescopically relative to the guide members and slidable vertically thereon, and having a top rail connected at its ends to the tubular side members, and a pair of oppositely extending, mutually overlapping, relatively movable V-shaped elements each consisting of an elongated member curved intermediate its ends to form an arched substantially U-shaped middle portion and having diverging end portions, one of the V-shaped elements being rigidly connected to the bottom and side rails of the gate frame and the other of the V-shaped elements being rigidly connected to the tubular side members and the top rail of the movable frame, with the U-shaped middle portions in mutually opposed relation to each other, the U-shaped middle portions being engageable in the and below an animal's neck to secure the animal in the gate, and a spring biased latch mounted on the top rail of the gate frame, engageable under the top rail of the movable frame whereby the movable frame is adapted to be secured in its uppermost position, having an elongated flexible element operatively connected thereto whereby the latch is releasable by pulling the elongated flexible element.

2. In combination with a stock chute having a pair of posts positioned on opposite sides thereof, a gate hinged to one of the posts and extending across the chute in its closed position, the gate comprising a rectangular gate frame having top, bottom, and side rails, a pair of elongated, vertically disposed guide members rigidly connected at their ends to the top and bottom rails of the gate frame, in spaced apart relation to each other, a movable frame having a pair of tubular side members arranged telescopically relative to the guide members and slidable vertically thereon, and having a top rail connected at its ends to the tubular side members, and a pair of oppositely extending, mutually overlapping, relatively movable V-shaped elements each consisting of an elongated member curved intermediate its ends to form an arched substantially U-shaped middle portion and having diverging end portions, one of the V-shaped elements being rigidly connected to the bottom and side rails of the gate frame and the other of the V-shaped elements being rigidly connected to the tubular side members and the top rail of the movable frame, with the U-shaped middle portions in mutually opposed relation to each other, the U-shaped middle portions being engageable above and below an animal's neck to secure the animal in the gate, a spring biased latch mounted on the top rail of the gate frame, engageable under the top rail of the movable frame whereby the movable frame is adapted to be secured in its uppermost position, having an elongated flexible element operatively connected thereto whereby the latch is releasable by pulling the elongated flexible element, a spring biased latch mounted on one of the tubular side members of the movable frame, frictionally engaging the corresponding guide member whereby the movable frame is secured against upward displacement relative to the gate frame, having a second elongated flexible element operatively connected thereto whereby the latch is releasable by pulling the second elongated flexible element, and mutually engaging means carried by the second elongated flexible element and the movable frame whereby the movable frame is adapted to be raised, by pulling the second elongated flexible element, after first pulling the second elongated flexible element sufficiently to release the latch.

3. The structure of claim 2, a compression spring on said one of the posts acting on the adjacent side of the gate to bias the gate in its open position, and a spring biased latch on the other of the posts, engageable with the opposite side of the gate to secure the gate in its closed position, having a third elongated flexible element operatively connected thereto whereby the latch is releasable by pulling the third elongated flexible element.

References Cited in the file of this patent
UNITED STATES PATENTS

| | | |
|---|---|---|
| 2,510,703 | Linton | June 6, 1950 |
| 2,650,567 | Whitworth | Sept. 1, 1953 |